(12) United States Patent
Bloom et al.

(10) Patent No.: US 7,623,178 B2
(45) Date of Patent: Nov. 24, 2009

(54) FOCUS VERIFICATION IN A DIGITAL IMAGING DEVICE

(75) Inventors: Daniel Bloom, Ft. Collins, CO (US); Jason Yost, Ft. Collins, CO (US); Stephen Pollard, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 11/495,310

(22) Filed: Jul. 28, 2006

(65) Prior Publication Data
US 2008/0024646 A1 Jan. 31, 2008

(51) Int. Cl.
H04N 5/232 (2006.01)
(52) U.S. Cl. .................. 348/346; 348/208.12; 348/345
(58) Field of Classification Search ......... 348/344–356, 348/360–370, 208.12–208.14; 396/52–56
See application file for complete search history.

(56) References Cited

U.S. PATENT DOCUMENTS

| | | | | |
|---|---|---|---|---|
| 5,499,074 A | * | 3/1996 | Ohsawa et al. | 396/121 |
| 6,366,736 B1 | * | 4/2002 | Nonaka | 396/106 |
| 6,430,370 B1 | * | 8/2002 | Nonaka | 396/89 |
| 7,158,182 B2 | * | 1/2007 | Watanabe et al. | 348/345 |
| 7,231,143 B2 | * | 6/2007 | Toji | 396/111 |
| 7,301,579 B2 | * | 11/2007 | Shinohara et al. | 348/345 |
| 7,389,042 B2 | * | 6/2008 | Lin et al. | 396/127 |
| 7,397,510 B2 | * | 7/2008 | Yasuda | 348/356 |
| 2003/0063212 A1 | * | 4/2003 | Watanabe et al. | 348/349 |
| 2005/0007486 A1 | * | 1/2005 | Fujii et al. | 348/345 |
| 2005/0168620 A1 | * | 8/2005 | Shiraishi | 348/345 |
| 2005/0185082 A1 | * | 8/2005 | Lee et al. | 348/345 |
| 2006/0033817 A1 | * | 2/2006 | Ishikawa et al. | 348/208.2 |
| 2006/0146174 A1 | * | 7/2006 | Hagino | 348/349 |
| 2006/0171699 A1 | * | 8/2006 | Nakai et al. | 396/125 |
| 2007/0094190 A1 | * | 4/2007 | Hagino | 706/45 |
| 2008/0001916 A1 | * | 1/2008 | Nozaki et al. | 345/156 |

* cited by examiner

*Primary Examiner*—Lin Ye
*Assistant Examiner*—Don Nguyen

(57) ABSTRACT

Disclosed are digital imaging devices that embody a method or algorithm for transitioning from a displayable focus process to a high speed focus process which can be displayed, and wherein the transition is accomplished in a seamless fashion. In addition, the digital imaging devices may embody a method for quickly verifying the focus quality of the image. If the focus quality is acceptable, the device indicates that focus is good and avoids a long auto-focus time.

11 Claims, 3 Drawing Sheets

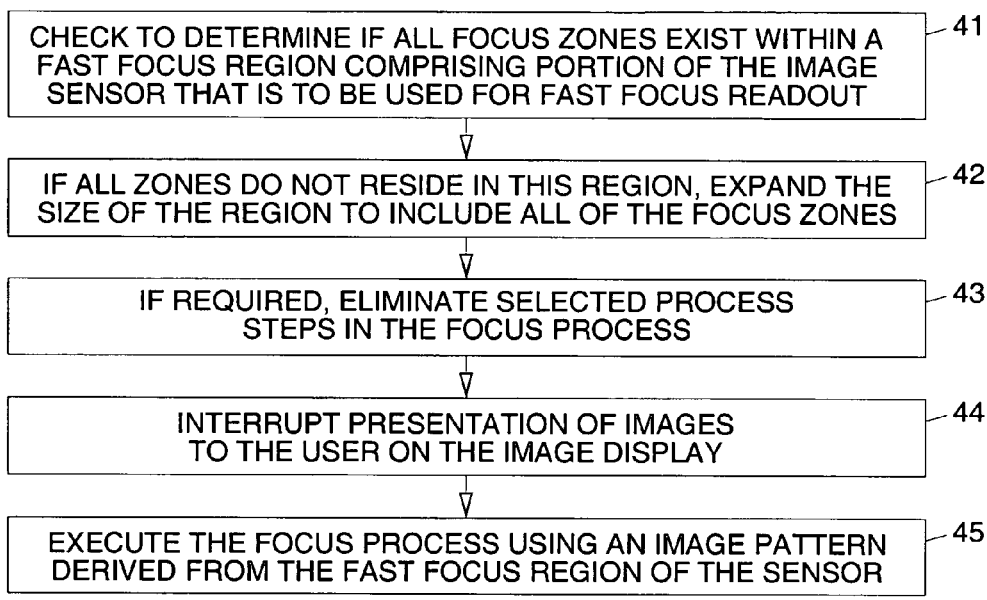
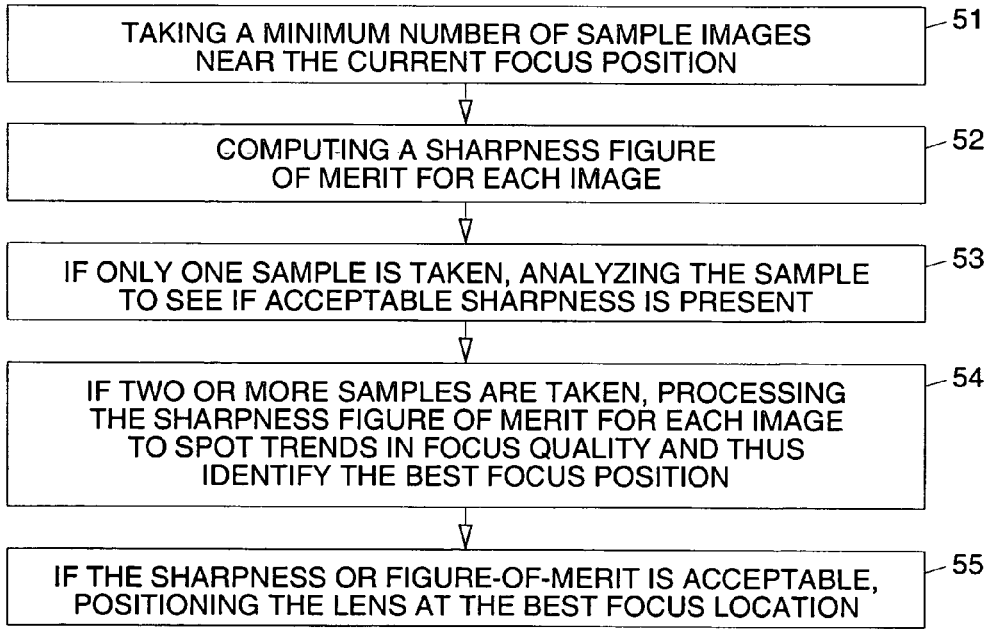

FOCUS VERIFICATION IN A DIGITAL IMAGING DEVICE

BACKGROUND

The present invention relates to digital imaging devices, and more particularly, to digital imaging devices that implement methods for transitioning from a displayable focus process to a high speed focus process, and for verifying focus, in a digital imaging device.

A typical digital imaging device may use a shutter release switch having at least two positions, referred to as S1 and S2. The preview mode may be initiated by depressing the shutter release switch to the S1 (preview) position. Taking a final photograph may be initiated by depressing the shutter release switch fully to the S2 (capture) position. The control that a photographer uses to initiate picture taking is referred to as a shutter release switch or button, even if the camera is entirely electronic and has no actual shutter mechanism.

There has been a strong desire to have imaging devices perform a focusing operation automatically based on the fact that the user simply points at an image scene. The drawback is that during this time the user is trying to compose the scene. Hence there is a need to have a continuous stream of images. This means that a "slow" focus rate is required because an image pattern that substantially covers the image sensor is being captured. Focusing using this continuous stream of images (continuous focus mode) is typically acceptable for liveview or video, but is not accurate enough for high resolution captured images. A problem also lies in the fact that user may want to capture an image before the focus process is completed. However, after pressing the shutter button to the capture (S2) position, there could be a significant delay. Thus, users of digital imaging devices are often annoyed by lengthy shutter lag times when taking pictures. Most of the lag comes from slow auto-focus times that occur after the users presses the shutter button to the preview (S1) position.

It would be desirable to have a solution to the problem of transitioning from a displayable focus process to a high speed focus process in a digital imaging device to minimize focusing delay time. It would also be desirable to quickly verify that the digital imaging device is in focus to avoid a long auto-focus delay.

BRIEF DESCRIPTION OF THE DRAWINGS

The various features and advantages of disclosed embodiments may be more readily understood with reference to the following detailed description taken in conjunction with the accompanying drawings, wherein like reference numerals designate like structural elements, and in which:

FIG. 4 is a flow diagram that illustrates an exemplary method for transitioning from a displayable focus process to a high speed focus process in a digital imaging device; and FIG. 5 is a flow diagram that illustrates an exemplary method for quickly verifying that a digital imaging device is in focus.

DETAILED DESCRIPTION

Figure 1A:
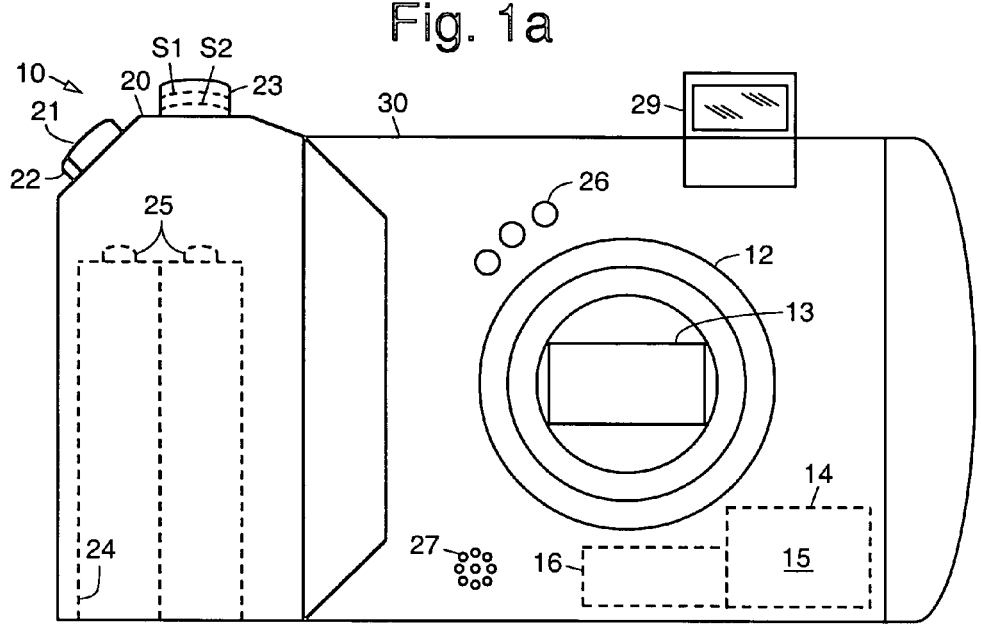
FIGS. 1a and 1b show front and back views, respectively, that illustrate an exemplary embodiment of a digital imaging device.

Disclosed is a method 40, or algorithm 40 (FIG. 4), for use in digital imaging devices 10 (FIGS. 1a and 1b) that transition from a slower focus process to a higher speed process once a shutter button has been pressed to the image capture position without losing the previous data generated with the slower focus process. Also disclosed is a method 50 (FIG. 5) for quickly verifying that the digital imaging device 10 is in focus.

Figure 1B:
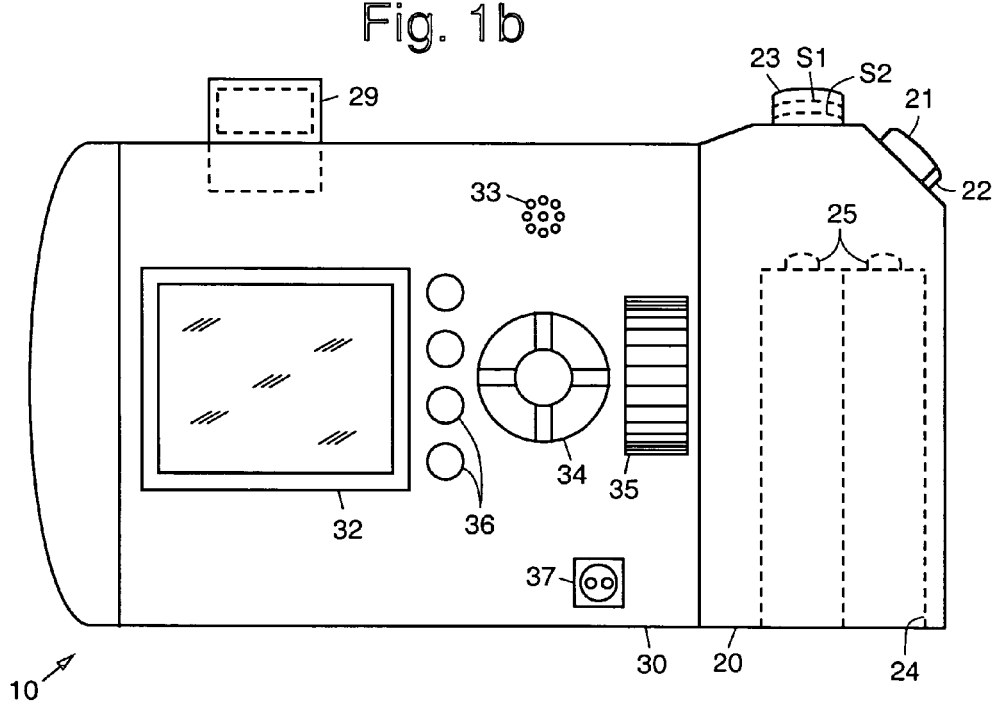

Referring to FIGS. 1a and 1b, they show front and back views, respectively, of an exemplary embodiment of a digital imaging device 10. The exemplary digital imaging device 10 implements methods 40, 50 for transitioning from a displayable focus process to a high speed focus process, and for verifying focus.

The exemplary digital imaging device 10 comprises a handgrip section 20 and a body section 30. The handgrip section 20 includes a power button 21 having a lock latch 22, a shutter button 23, and a battery compartment 24 for housing batteries 25. The shutter button 23 may be depressed so that the button is at one of two positions, S1 and S2. The S1 position corresponds to a preview position, while the S2 position corresponds to an image capture position. A metering element 26 and microphone 27 are disposed on a front surface of the digital imaging device 10. A pop-up flash 29 is located adjacent a top surface of the digital imaging device 10.

As is shown in FIG. 1b, a rear surface of the exemplary digital imaging device 10 includes an image display 32, such as a liquid crystal display (LCD) 32, for example, a rear microphone 33, a joystick pad 34, a zoom control dial 35, a plurality of buttons 36 for setting functions of the digital imaging device 10, and an output port 37 for downloading images to an external display device or computer, for example.

The digital imaging device 10 also comprises a moveable lens 12 or imaging optics 12 controlled by a lens positioning motor, and an image sensor 13 for receiving images transmitted by the imaging optics 12 and capturing digital images. A processor 14 is coupled to the image sensor 13 (and other control and input/output components). The processor 14 is also coupled to image memory 16, which may include internal memory and removable memory. The processor 14 comprises one or more focus algorithms 15 that implement the transitioning and focus verifying methods 40, 50.

Figure 2:
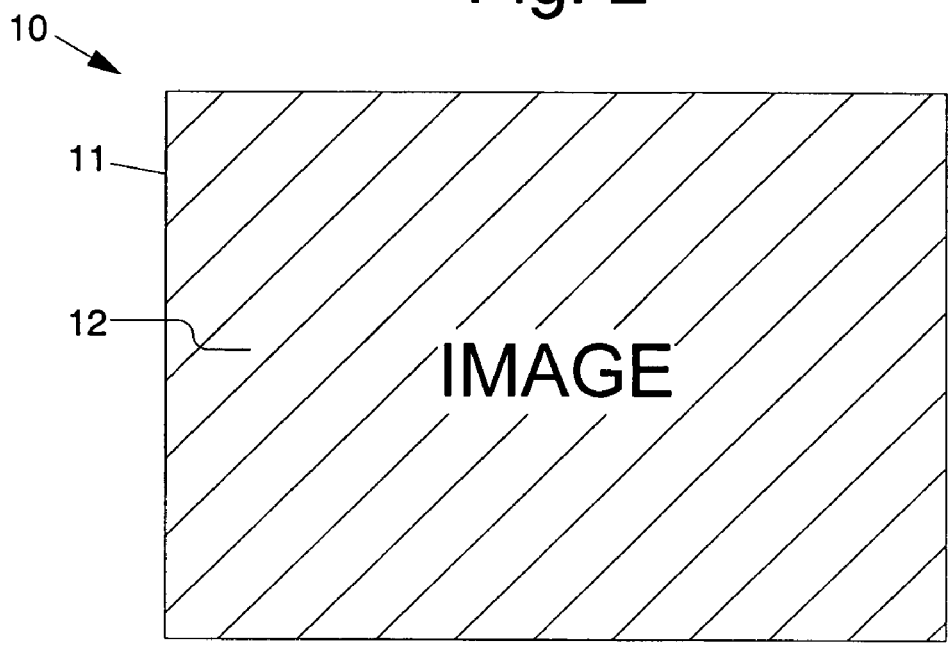
FIG. 2 illustrates an exemplary full frame image captured by the exemplary digital imaging device.
Figure 3:
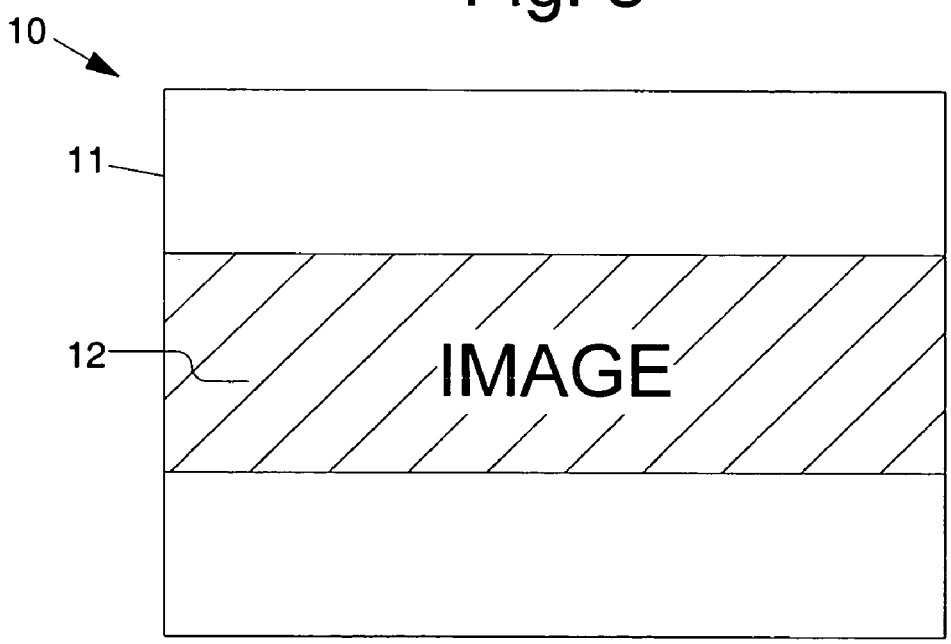
FIG. 3 illustrates an exemplary part frame image captured by the exemplary digital imaging device.

One way for the digital imaging device 10 to perform a lens focus process is to use a stream of captured images to make contrast measurements. There are a number of ways these images may be generated. One possible way is shown in FIG. 2, which illustrates an exemplary full frame image captured by the exemplary digital imaging device 10, and wherein the captured image covers the entire image sensor 13. Another possible way is to read only a section of the data, such as is shown in FIG. 3, which illustrates an exemplary part frame image captured by the exemplary digital imaging device 10. Typically, it takes significantly longer the capture the pattern illustrated in FIG. 2, than it is to capture the pattern illustrated in FIG. 3.

The approach of capturing a full sensor image shown in FIG. 2 may be referred to as liveview focus mode or process. In this mode the user can see the actual focus process occurring. For simplicity, the focus process using the captured pattern shown in FIG. 3 may be referred to as a fast focus process.

The pattern in FIG. 2 is typically displayable to the user given that the pattern covers the entire sensor 13. On the other hand the pattern in FIG. 3 is usually not considered displayable, given that the pattern only covers a portion of the sensor 13. From the standpoint of performing a focus operation, the pattern in FIG. 3 will result in a faster focus process than what can be achieved with the pattern in FIG. 2. However, the user may not be able to view the stream of images captured by the digital imaging device 10. The disclosed methods 40, 50 address this problem.

The digital imaging device 10 performs the liveview focus process after the shutter button 23 is pressed to the preview (S1) position. The auto-focus procedure involves moving the lens 12 using the lens positioning motor throughout a wide range and capturing an image at each of a number of locations. A focus figure-of-merit is computed at each location and the best focus is determined.

Focus time may be reduced by optimizing the exposure, readout, calculation and lens movement times. This may be done by simultaneously performing these tasks, when possible, and attempting to make each of the times as short as possible.

While performing the liveview focus process, the device 10 typically reacts to the user pressing the shutter button to the capture (S2) position in two ways. The first to continue the liveview focus process. The second is for the device 10 to abort the liveview focus process and start the fast focus process. In this case, the data collected in the liveview focus process is thrown away. In either case, the result is that the user experiences a long delay waiting for the process to complete. This problem is rectified by the methods 40, 50 described below.

FIG. 4 is a flow diagram that illustrates details of an exemplary method 40 for transitioning from a displayable (liveview) focus process to a high speed focus process in a digital imaging device. The displayable (liveview) focus process may be implemented as follows.

An image is captured that contains scene content similar to images normally used for liveview display purposes. This image is routed to both a focus metric computation and to the image display 32. The image display 32 properly scales the size and exposure of the image so that the camera user cannot tell the difference between this image and a conventional liveview image. The focus computation subdivides the image into zones of interest and computes a metric for sharpness on each zone.

The transitioning method 40 involves a unique way of dealing with the user pressing the shutter button 23 to the capture (S2) position. In the transitioning method 40, the focus seamlessly transitions from the liveview focus process to the fast focus process without destroying the data obtained in the liveview focus process.

The fast focus process captures and reads an image from the sensor 13 in the same way as the displayable (liveview) focus process except that a smaller area is captured. Unlike a traditional focus readout used in digital cameras, the method of reading out the fast focus is constructed to mimic the displayable focus readout so that the exposure, sensor timing, pixel combining, sensor setup and motor movement synchronization are essentially the same between both types of image capture. The focus metric computation subdivides the captured images into smaller zones of interest and computes a metric for sharpness on each smaller zone. The focus sharpness metric need only change the relative location of the focus zones in order compensate for the varying image size.

The method 40 first checks 41 if all focus zones exist within the region that is used for fast focus readout (FIG. 3). This is a region that comprises a portion of the image sensor 13. If all the zones do not reside in this region, the size of the region is expanded 42 to include all of the focus zones. The method 40 may require elimination 43 of certain process steps in the focus process. Elimination 43 of such process steps may be required if the processor 14 used for the focus process cannot handle a higher frame rate; for example, the process steps might be computationally intensive. An exemplary process step that may be eliminated might include image stabilization of a focus zone for which there is no hardware assist for adjusting the zone (i.e., a processor-based implementation). The focus process 40 then disconnects 44 the image display 32 from presenting images to the user (i.e., interrupts presentation of images to the user). The process 40 then executes 45 the focus process using the image pattern shown in FIG. 3.

The transitioning method provides a critical advantage over previously known approaches in that the capture lag after pressing the shutter button 23 to the capture (S2) position can be greatly reduced. This has been a major detractor in digital imaging devices. Using the disclosed method, if the user presses the shutter button 23 to the capture (S2) position while the liveview focus process is trying to complete, there is a good chance that the delay will be acceptable. This is a very noticeable effect using the seamless transition.

It is also desirable to quickly verify that the digital imaging device 10 is in focus to avoid a long auto-focus delay. In this regard, the digital imaging device 10, such as a digital camera, for example, performs continuous focus processing. In accordance with the focus verification method 50, when the user presses the shutter button 23 to the preview (S1) position, the digital imaging device performs a quick verification that the current focus is acceptable. If the focus is acceptable or only needs a slight modification, then the typical auto-focus delay can be minimized or eliminated.

The quick focus verification method 50 is performed by taking 51 a minimum number of sample images near the current focus position and computing 52 a sharpness figure-of-merit for each image. If only one sample is taken, then the sample is analyzed 53 to see if acceptable sharpness is present. If two or more samples are taken, then the sharpness figure-of-merit for each image is processed to spot trends in focus quality and thus identify 54 the best focus position.

The best focus position is related to the highest sharpness metric. When only two samples exist, the sample with the highest sharpness metric may be considered the most in-focus. When many samples exist, a curve fit, weighted averaging or similar statistical process may be used to find the most in-focus sample. When using these statistical methods, it is common to determine that the most in-focus lens position is between to samples.

If the sharpness of figure-of-merit is not adequate to determine the best focus position, then a full auto-focus may be required. If the sharpness or figure-of-merit is acceptable, then the lens positioning motor will position 55 the lens at the best focus position and the processor 14 in the digital imaging device 10 will wait for the shutter button to be depressed 23 to the capture (S2) position, after which an image will be recorded.

The quick focus verification method provides a way to dramatically reduce the shutter lag time. The focus time is reduced to a small fraction of the typical delay time.

Thus, methods for transitioning from a displayable focus process to a high speed focus process, and for verifying focus, in a digital imaging device have been disclosed. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. A method for use in a digital imaging device having an image sensor, an image display, a shutter button that is depressible to preview and image capture positions, and a processor for processing image and focus data using a focus algorithm, comprising:
    checking if all focus zones exist within a fast focus region comprising a portion of the image sensor;
    if all the zones do not reside in this region, expanding the size of the region to include all of the focus zones;
    interrupting presentation of images to a user; and
    executing a focus process using an image pattern derived from the fast focus region of the image sensor;
    eliminating image stabilization of a focus zone for which there is no hardware assist for adjusting the focus zone when the focus process cannot handle an increased frame rate.

2. The method recited in claim 1 further comprising:
    taking a predetermined number of sample images near a current focus position;
    computing a sharpness figure-of-merit for each image;
    if only one sample image is taken, analyzing the sample image to see if acceptable sharpness is present;
    if two or more sample images are taken, processing the sharpness figure-of-merit for each image to spot trends in focus quality and identify the best focus position; and
    if the sharpness or figure-of-merit is acceptable, positioning the lens at the best focus position.

3. The method recited in claim 2 wherein, if the sharpness of figure-of-merit is not adequate to determine the best focus position, processing the images using a full auto-focus process.

4. A method for use in a digital imaging device having an image sensor, an image display, a shutter button that is depressible to preview and image capture positions, and a processor for processing image and focus data using a focus algorithm, comprising:
    taking a predetermined number of sample images near a current focus position;
    computing a sharpness figure-of-merit for each image;
    if only one sample is taken, analyzing the sample to see if acceptable sharpness is present;
    if two or more samples are taken, processing the sharpness figure-of-merit for each image to spot trends in focus quality and identify the best focus position;
    if the sharpness or figure-of-merit is acceptable, positioning the lens at the focus position corresponding to the acceptable sharpness figure-of-merit; and
    eliminating image stabilization of a focus zone for which there is no hardware assist for adjusting the focus zone when the processor cannot handle an increased frame rate when the focus position is changed.

5. The method recited in claim 4 wherein, if the sharpness of figure-of-merit is not adequate to determine the best focus position, processing the images using a full auto-focus process.

6. A digital imaging device comprising:
    an image sensor;
    an image display;
    a shutter button that is depressible to preview and image capture positions; and
    a processor for processing image and focus data using a focus algorithm that:
        determines if all focus zones exist within a fast focus region comprising a portion of the image sensor;
        if all the zones do not reside in this region, expands the size of the region to include all of the focus zones;
        interrupts display of images to a user on the image display;
        executes a focus process using an image pattern derived from the fast focus region of the image sensor; and
        eliminates image stabilization of a focus zone for which there is no hardware assist for adjusting the focus zone when the focus process cannot handle an increased frame rate.

7. The device recited in claim 6 wherein the focus algorithm:
    takes a predetermined number of sample images near a current focus position;
    computes a sharpness figure-of-merit for each image;
    if only one sample is taken, analyzes the sample to see if acceptable sharpness is present;
    if two or more samples are taken, processes the sharpness figure-of-merit for each image to spot trends in focus quality and identify the best focus position; and
    if the sharpness or figure-of-merit is acceptable, positions the lens at the best focus position.

8. The device recited in claim 7 wherein, if the sharpness of figure-of-merit is not adequate to determine the best focus position, the focus algorithm processes the images using a full auto-focus process.

9. A digital imaging device comprising:
    image sensing means for sensing an image;
    image display means for displaying a sensed image;
    shutter means that is depressible to preview and image capture positions; and
    processor means for processing image and focus data using a focus algorithm that:
        determines if all focus zones exist within a predetermined portion of the image sensor;
        if all the zones do not reside in this region, enlarges the size of the region to include all of the focus zones;
        interrupts display of images on the image display means;
        executes a focus process using an image pattern derived from the fast focus region of the image sensor; and
        eliminates image stabilization of a focus zone for which there is no hardware assist for adjusting the focus zone if the focus process cannot handle a higher frame rate.

10. The device recited in claim 9 wherein the focus algorithm:
    takes a predetermined number of sample images near a current focus position;
    computes a sharpness figure-of-merit for each image;
    if only one sample is taken, analyzes the sample to see if acceptable sharpness is present;
    if two or more samples are taken, processes the sharpness figure-of-merit for each image to spot trends in focus quality and identify the best focus position; and
    if the sharpness or figure-of-merit is acceptable, positions the lens at the best focus position.

11. The device recited in claim 10 wherein, if the sharpness of figure-of-merit is not adequate to determine the best focus position, the focus algorithm processes the images using a full auto-focus process.

* * * * *